(12) United States Patent
Lee et al.

(10) Patent No.: US 10,288,916 B2
(45) Date of Patent: May 14, 2019

(54) LIQUID CRYSTAL DISPLAY DEVICE

(71) Applicant: Samsung Display Co., Ltd., Yongin-si, Gyeonggi-do (KR)

(72) Inventors: Mihwa Lee, Seoul (KR); Minhee Kim, Ansan-si (KR); Taeho Kim, Yongin-si (KR); Soyoun Park, Hwaseong-si (KR); Soojung Youn, Seoul (KR); Changhun Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 8 days.

(21) Appl. No.: 15/423,062

(22) Filed: Feb. 2, 2017

(65) Prior Publication Data

US 2018/0004025 A1    Jan. 4, 2018

(30) Foreign Application Priority Data

Jul. 4, 2016   (KR) .......................... 10-2016-0084267

(51) Int. Cl.
*G02F 1/1343* (2006.01)
*G02F 1/133* (2006.01)
(Continued)

(52) U.S. Cl.
CPC .......... *G02F 1/13306* (2013.01); *G02F 1/137* (2013.01); *G02F 1/1368* (2013.01); *G02F 1/13439* (2013.01); *G02F 1/134309* (2013.01); *G02F 1/136286* (2013.01); *G02F 1/134363* (2013.01); *G02F 2001/13706* (2013.01); *G02F 2001/134372* (2013.01); *G02F 2201/123* (2013.01); *G02F 2201/124* (2013.01)

(58) Field of Classification Search
CPC ... G02F 1/134363; G02F 2001/134372; G02F 1/134309; G02F 1/13439; G02F 2201/123; G02F 2201/124
USPC ........................................................ 349/141
See application file for complete search history.

(56) References Cited

U.S. PATENT DOCUMENTS

2002/0036743 A1* 3/2002 Youn ................. G02F 1/134363
                                                    349/141
2002/0057411 A1* 5/2002 Kim .................. G02F 1/133512
                                                    349/141
(Continued)

FOREIGN PATENT DOCUMENTS

KR   10-2007-0119260 A   12/2007
KR   10-2010-0046826 A    5/2010
(Continued)

*Primary Examiner* — Angela K Davison
(74) *Attorney, Agent, or Firm* — Innovation Counsel LLP

(57) ABSTRACT

A liquid crystal display ("LCD") device is capable of consuming relatively less power and significantly reducing flickering that may occur when the LCD device is driven by low frequency, the LCD device including: a liquid crystal layer disposed between the first substrate and the second substrate; a gate line; a data line intersecting the gate line; a timing controller outputting a gate control signal by a frequency of about 15 hertz (Hz) to about 30 Hz; a first electrode on the first substrate; and a second electrode on the first substrate, the second electrode spaced apart from the first electrode. The first electrode includes a plurality of first branch electrodes having an angle of about 9 degrees to about 30 degrees with respect to a normal line which is orthogonal to the gate line.

14 Claims, 9 Drawing Sheets

(51) Int. Cl.
*G02F 1/1362* (2006.01)
*G02F 1/1368* (2006.01)
*G02F 1/137* (2006.01)

(56) References Cited

U.S. PATENT DOCUMENTS

| | | | | |
|---|---|---|---|---|
| 2006/0146252 A1* | 7/2006 | Kang | ................ | G02F 1/134363 |
| | | | | 349/141 |
| 2009/0296037 A1* | 12/2009 | Tanaka | .............. | G02F 1/134363 |
| | | | | 349/143 |
| 2012/0218501 A1* | 8/2012 | Lee | .................. | G02F 1/134363 |
| | | | | 349/139 |
| 2014/0063429 A1* | 3/2014 | Huh | ................. | G02F 1/133707 |
| | | | | 349/139 |
| 2015/0002800 A1* | 1/2015 | Tashiro | ............. | G02F 1/134309 |
| | | | | 349/124 |
| 2016/0026044 A1 | 1/2016 | Nam et al. | | |

FOREIGN PATENT DOCUMENTS

KR    10-2014-0083171 A    7/2014
KR    10-2016-0013444 A    2/2016

* cited by examiner

LIQUID CRYSTAL DISPLAY DEVICE

CROSS-REFERENCE TO RELATED APPLICATION

This application claims the priority to and the benefit of Korean Patent Application No. 10-2016-0084267, filed on Jul. 4, 2016, which is hereby incorporated by reference for all purposes as if fully set forth herein.

BACKGROUND

1. Field

Exemplary embodiments of the inventive concept relate to a liquid crystal display ("LCD") device.

2. Description of the Related Art

A liquid crystal display ("LCD") device is a type of a flat panel display ("FPD"), which is widely used in recently for various applications. The LCD device includes two substrates respectively including two electrodes formed thereon and a liquid crystal layer interposed therebetween. Upon applying voltage to the two electrodes, liquid crystal molecules of the liquid crystal layer are rearranged such that an amount of transmitted light is controlled in the LCD device.

The LCD device externally receives an input image signal, and each pixel receives a data voltage corresponding to the input image signal. A pixel voltage is determined based on a difference between the data voltage applied to the pixel and a common voltage applied to a common electrode, and each pixel displays an image based on a voltage level of the pixel voltage.

In such an example, in order to prevent deterioration that may occur when an electric field is applied for a long period of time to the liquid crystal layer in one direction, a polarity of the data voltage with respect to the common voltage is inversed for each frame, for each row, for each column, or for each pixel. In addition, in order to prevent spots, such as a vertical line, on a display screen, pixel voltages of different polarities may be applied to adjacent pixels, respectively.

By virtue of liquid crystals in the LCD device, there is a difference in response characteristics between "rising," in which a polarity of the pixel voltage is changed from negative to positive, and "falling," in which the polarity of the pixel voltage is changed from positive to negative. Generally, the response speed of rising is slower than the response speed of falling, and such a difference in the response speed causes a change of luminance.

The change of luminance in accordance with the response speed may not generally cause issues when driving an LCD device with high frequency, but in the case that an LCD device is driven with low frequency in order to reduce power consumption of the LCD device, the luminance difference may be visually recognized. Accordingly, flickering may be recognized, thus degrading display quality.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a liquid crystal display ("LCD") device that may consume relatively less power and may significantly reduce flickering that may occur when the LCD device is driven by low frequency.

According to an exemplary embodiment of the inventive concept, a liquid crystal display device includes: a first substrate and a second substrate opposing each other; a liquid crystal layer disposed between the first substrate and the second substrate; a gate line disposed on the first substrate, the gate line extending in a first direction; a data line intersecting the gate line; a timing controller connected to the gate line, the timing controller outputting a gate control signal by a frequency of about 15 hertz (Hz) to about 30 Hz; a first electrode disposed on the first substrate; and a second electrode disposed on the first substrate, the second electrode spaced apart from the first electrode. The first electrode includes a plurality of first branch electrodes having an angle of about 9 degrees to about 30 degrees with respect to a normal line which is orthogonal to the gate line.

The first electrode may further include a connecting electrode that connects the plurality of first branch electrodes. The connecting electrode may be parallel to the gate line.

The first branch electrode may include at least one bent portion.

The plurality of first branch electrodes may have a first width, the plurality of first branch electrodes may be spaced apart from one another at a first distance, and the first distance may be greater than the first width.

A sum of the first width and the first distance may be in a range of about 5.0 μm to about 6.0 μm.

A ratio between the first distance and the first width may be in a range of about 1:0.65 to about 1:0.85.

The first branch electrode may be symmetric with respect to a bent portion.

The data line may extend in a second direction which is substantially orthogonal to the first direction.

The data line may extend substantially parallel to the first branch electrode.

The liquid crystal layer may include liquid crystal molecules having positive dielectric anisotropy.

The second electrode may be a planar electrode.

The second electrode may include a second branch electrode parallel to the first branch electrode.

The second electrode may be disposed on substantially a same layer as a layer on which the first electrode is disposed.

The liquid crystal display device may further include a thin film transistor disposed on the first substrate, the thin film transistor connected to the gate line and the data line.

The first electrode may be connected to the thin film transistor.

The second electrode may be connected to the thin film transistor.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept and are incorporated in and constitute a part of this specification, illustrate exemplary embodiments of the inventive concept, and, together with the description, serve to explain principles of the inventive concept.

DETAILED DESCRIPTION

Figure 1:
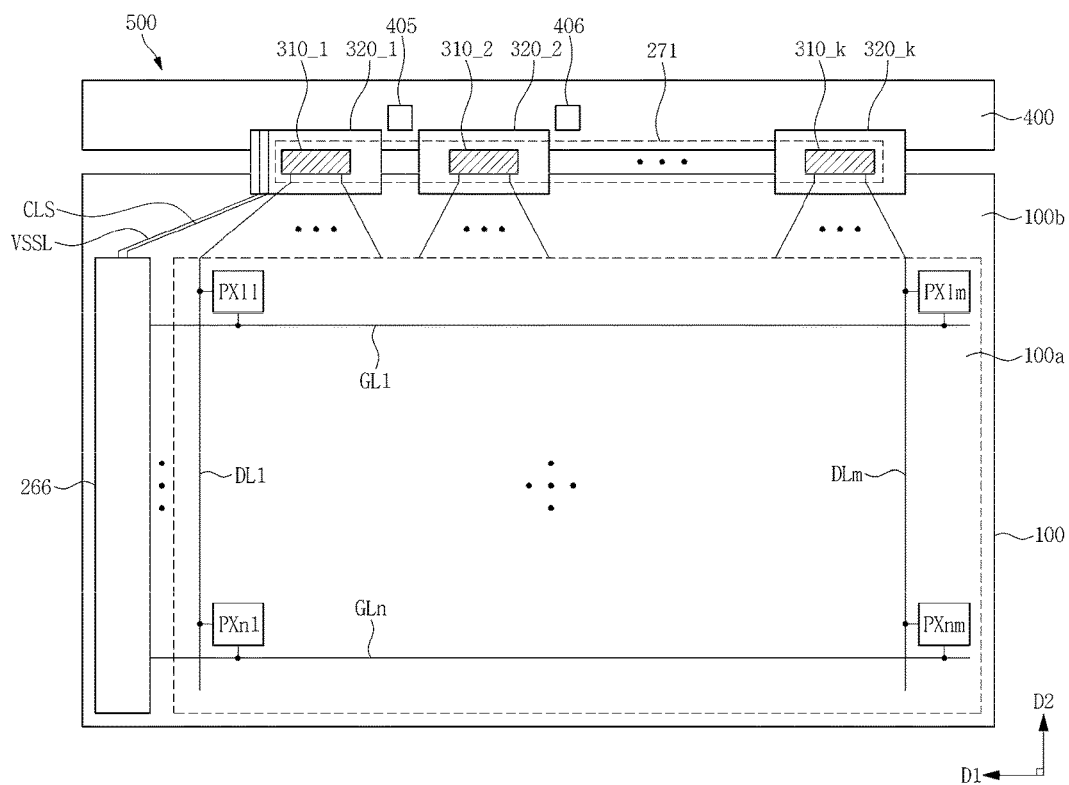
FIG. 1 is a plan view illustrating a first exemplary embodiment of a liquid crystal display ("LCD") device.

Advantages and features of the inventive concept and methods for achieving them will be made clear from exemplary embodiments described below in detail with reference to the accompanying drawings. The inventive concept may, however, be embodied in many different forms and should not be construed as being limited to the exemplary embodiments set forth herein. Rather, these exemplary embodiments are provided so that this disclosure will be thorough and complete, and will fully convey the scope of the inventive concept to those skilled in the art. The inventive concept is merely defined by the scope of the claims. Therefore, well-known constituent elements, operations and techniques are not described in detail in the exemplary embodiments in order to prevent the inventive concept from being obscurely interpreted. Like reference numerals refer to like elements throughout the specification.

In the drawings, thicknesses of a plurality of layers and areas are illustrated in an enlarged manner for clarity and ease of description thereof. When a layer, area, or plate is referred to as being "on" another layer, area, or plate, it may be directly on the other layer, area, or plate, or intervening layers, areas, or plates may be present therebetween. Conversely, when a layer, area, or plate is referred to as being "directly on" another layer, area, or plate, intervening layers, areas, or plates may be absent therebetween. Further when a layer, area, or plate is referred to as being "below" another layer, area, or plate, it may be directly below the other layer, area, or plate, or intervening layers, areas, or plates may be present therebetween. Conversely, when a layer, area, or plate is referred to as being "directly below" another layer, area, or plate, intervening layers, areas, or plates may be absent therebetween.

The spatially relative terms "below", "beneath", "less", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It will be understood that, although the terms "first," "second," "third," and the like may be used herein to describe various elements, these elements should not be limited by these terms. These terms are only used to distinguish one element from another element. Thus, "a first element" discussed below could be termed "a second element" or "a third element," and "a second element" and "a third element" can be termed likewise without departing from the teachings herein.

Unless otherwise defined, all terms used herein (including technical and scientific terms) have the same meaning as commonly understood by those skilled in the art to which this inventive concept pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Some of the parts which are not associated with the description may not be provided in order to specifically describe embodiments of the present inventive concept, and like reference numerals refer to like elements throughout the specification.

FIG. 1 is a plan view illustrating a first exemplary embodiment of a liquid crystal display ("LCD") device 500.

Referring to FIG. 1, a first exemplary embodiment of the LCD device 500 includes a lower panel 100, an upper panel 200 (refer to FIG. 3), a gate driver 266, a data driver 271, a circuit board 400, a timing controller 405, and a power supply unit 406.

The lower panel 100 includes a display area 100a in which a plurality of pixels PX11-PXnm arranged in a matrix form are disposed, a non-display area 100b surrounding the display area 100a, a plurality of gate lines GL1-GLn extending in a first direction D1, a plurality of data lines DL1-DLm intersecting the plurality of gate lines GL1-GLn, a control signal wiring unit CLS, and an off-voltage line VSSL.

The gate lines GL1-GLn are connected to the gate driver 266. The gate lines GL1-GLn sequentially receive gate signals generated from the gate driver 266.

The data lines DL1-DLm are connected to the data driver 271. The data lines DL1-DLm receive data voltages, in an analog form, applied thereto from the data driver 271.

The pixels PX11-PXnm are disposed in areas at which the gate lines GL1-GLn and the data lines DL1-DLm intersect one another. The pixels PX11-PXnm may be arranged in "m" number of columns and "n" number of rows, the columns and rows intersecting one another. Herein, "m" and "n" may each be an integer greater than zero.

The pixels PX11-PXnm are connected to the gate lines GL1-GLn and the data lines DL1-DLm, respectively, in a corresponding manner. Each pixel PX receives the data voltage from the data line DL, in response to the gate signal applied from the gate line GL. The pixel PX may represent a gray scale corresponding to the data voltage.

The control signal wiring unit CLS is connected to the gate driver 266 through a flexible printed circuit board ("FPCB") 320_1, for example, a FPCB disposed in a leftmost or a rightmost of the FPCB, and receives gate control signals from the timing controller 405 which is mounted on the circuit board 400. In such an exemplary embodiment, the timing controller 405 outputs the gate control signal at a frequency of about 15 hertz (Hz) to about 30 Hz. The gate control signals are applied to the gate driver 266 through the control signal wiring unit CLS.

The off-voltage line VSSL is connected to the gate driver 266 through the leftmost FPCB 320_1. The off-voltage line VSSL may receive an off voltage from the power supply unit 406 mounted on the circuit board 400. The off voltage may be supplied to the gate driver 266 through the off-voltage line VSSL.

The gate driver 266 may be disposed in a portion of the non-display area 100b adjacent to a side of the display area 100a. In detail, the gate driver 266 may be disposed on a portion of the non-display area 100b adjacent to a left side of the display area 100a. The gate driver 266 sequentially generates the gate signals using the gate control signals applied from the timing controller 405 through the control signal wiring unit CLS, and applies the generated gate signals to the gate lines GL1-GLn. The gate lines GL1-GLn are driven sequentially from an uppermost gate line GL1 to a lowermost gate line GLn.

The data driver 271 receives data signals supplied from the timing controller 405, and generates analog data voltages corresponding to the applied data signals. The data driver 271 applies the data voltages to the pixels PX11-PXnm through the data lines DL1-DLm. The data driver 271 includes a plurality of source driving chips 310_1-310_k. Herein, "k" is an integer greater than zero and less than "m". The source driving chips 310_1-310_k are mounted on corresponding ones of the FPCBs 320_1-320_k. The source driving chips 310_1-310_k are connected between the circuit board 400 and a portion of the non-display area 100b adjacent to an upper portion of the display area 100a. In an exemplary embodiment, the source driving chips 310_1-310_k may be mounted on the portion of the non-display area 100b adjacent to the upper portion of the display area 100a in a chip on glass ("COG") manner.

In such an exemplary embodiment, the timing controller 405 and the power supply unit 406 according to a first exemplary embodiment are depicted as being mounted on the circuit board 400, but exemplary embodiments are not limited thereto.

Figure 2:
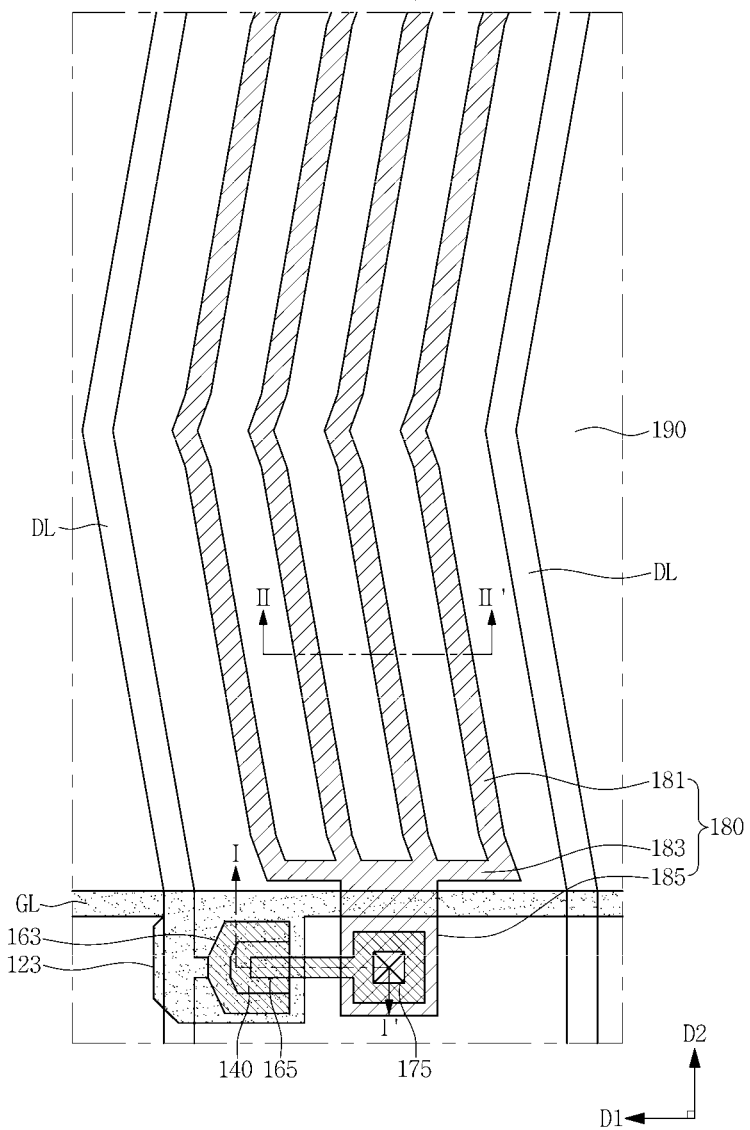
FIG. 2 is a plan view illustrating a pixel of FIG. 1.
Figure 3:
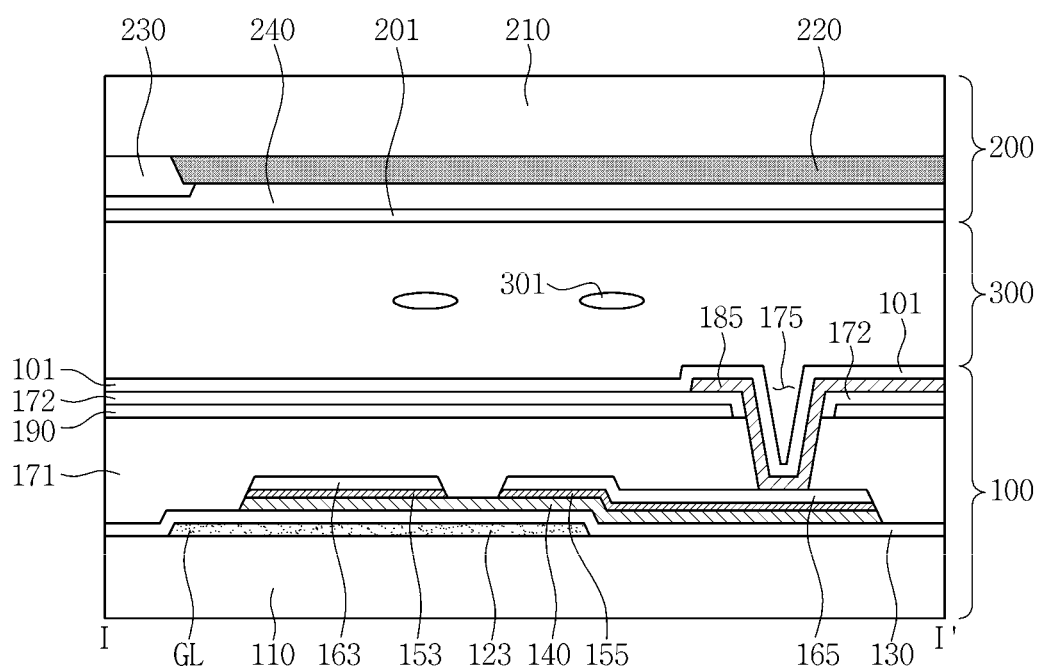
FIG. 3 is a cross-sectional view taken along line I-I' of FIG. 2.
Figure 4:
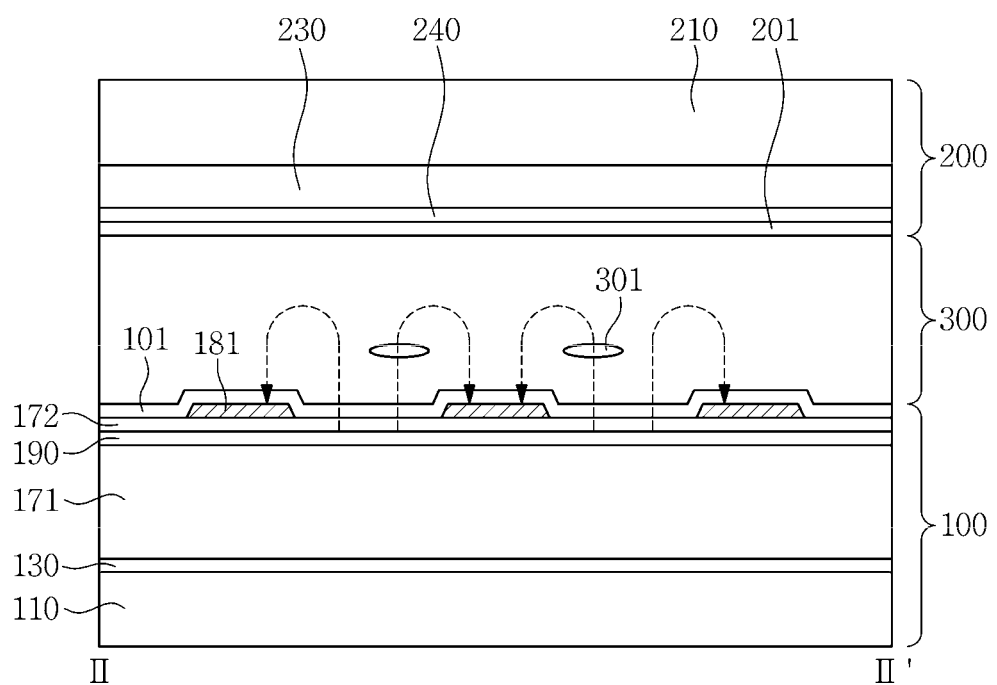
FIG. 4 is a cross-sectional view taken along line II-IP of FIG. 2.

FIG. 2 is a plan view illustrating a pixel of FIG. 1, FIG. 3 is a cross-sectional view taken along line I-I' of FIG. 2, and FIG. 4 is a cross-sectional view taken along line II-IP of FIG. 2.

Referring to FIGS. 2, 3, and 4, a first exemplary embodiment of the LCD device 500 includes the lower panel 100, the upper panel 200 opposing the lower panel 100, and a liquid crystal layer 300 disposed between the lower panel 100 and the upper panel 200.

The liquid crystal layer 300 is disposed in an area enclosed by a sealing member (not illustrated) between the lower panel 100 and the upper panel 200. The liquid crystal layer 300 may include liquid crystal molecules 301 having positive dielectric anisotropy. The sealing member may be disposed on one of the lower panel 100 and the upper panel 200, and couple the lower panel 100 and the upper panel 200 together.

The lower panel 100 and the upper panel 200 may maintain a cell gap, in a range of about 2.0 μm to about 5.0 μm, for example, in a range of about 3.3 μm to about 3.7 μm, by the sealing member (not illustrated) or a spacer member (not illustrated).

Linear polarizers (not illustrated) may be disposed on each of the lower panel 100 and the upper panel 200 so that respective ones of polarization axes or transmission axes of the linear polarizers substantially intersect each other. That is, the linear polarizers may be disposed above or below the lower panel 100, and above or below the upper panel 200.

Firstly, the lower panel 100 is to be described.

A first substrate 110 is an insulating substrate including plastic or transparent glass such as soda lime glass or borosilicate glass, for example.

A gate wiring GL and 123 which transmits the gate signal is disposed on the first substrate 110.

The gate wiring GL and 123 may include or be formed of aluminum (Al) or alloys thereof, silver (Ag) or alloys thereof, copper (Cu) or alloys thereof, molybdenum (Mo) or alloys thereof, chromium (Cr), tantalum (Ta), titanium (Ti), and/or the like.

In addition, the gate wiring GL and 123 may have a multilayer structure including two or more conductive layers (not illustrated) having different physical properties. For example, one conductive layer of the multilayer structure may include or be formed of a metal, e.g., an aluminum (Al)-based metal, a silver (Ag)-based metal, and a copper (Cu)-based metal, which has low resistivity to reduce signal delay or voltage drop, and another conductive layer of the multilayer structure may include a material, e.g., a molybdenum-based metal, chromium, titanium, tantalum, and the like, which is found to impart an excellent contact property with indium tin oxide (ITO) and indium zinc oxide (IZO).

Examples of the multilayer structure may include a chromium lower layer and an aluminum upper layer, an aluminum lower layer and a molybdenum upper layer, and a titanium lower layer and a copper upper layer. However, exemplary embodiments are not limited thereto, and the gate wiring GL and 123 may include various kinds of metals and conductors.

The gate wiring GL and 123 includes a gate line GL extending, for example, in a first direction D1, and a gate electrode 123 protruding from the gate line GL to form a protrusion.

The gate electrode 123, along with a source electrode 163 and a drain electrode 165 to be described hereinbelow, forms three terminals of a thin film transistor ("TFT").

A gate insulating layer 130 is disposed on the first substrate 110 on which the gate wiring GL and 123 is disposed. The gate insulating layer 130 may include silicon nitride ($SiN_x$) or silicon oxide ($SiO_x$). In addition, the gate insulating layer 130 may further include aluminum oxide, titanium oxide, tantalum oxide, or zirconium oxide.

A semiconductor layer 140 is disposed on the gate insulating layer 130. The semiconductor layer 140 may be disposed to substantially overlap the source electrode 163 and the drain electrode 165 to be described hereinbelow. However, exemplary embodiments are not limited thereto, and the semiconductor layer 140 may be disposed to overlap a data wiring DL, 163, and 165, or may be disposed only in a portion of the gate insulating layer 130 corresponding to the gate electrode 123.

The semiconductor layer 140 may include amorphous silicon (hereinafter, a-Si), crystalline silicon (poly-Si), an oxide semiconductor including at least one selected from a group consisting of gallium (Ga), indium (In), tin (Sn), and zinc (Zn), or the like.

Ohmic contact layers 153 and 155 are disposed on the semiconductor layer 140. The ohmic contact layers 153 and 155 may improve contact properties between the semiconductor layer 140 and the source electrode 163 and between the semiconductor layer 140 and the drain electrode 165. The ohmic contact layers 153 and 155 may not overlap a channel area between the source electrode 163 and the drain electrode 165.

Herein, the ohmic contact layers 153 and 155 may include amorphous silicon doped with n-type impurities (n+a-Si) at a high concentration. In a case that the contact properties between the semiconductor layer 140 and the source electrode 163 and between the semiconductor layer 140 and the drain electrode 165 is sufficiently secured, the ohmic contact layers 153 and 155 may be omitted.

The data wiring DL, 163, and 165 is disposed on the semiconductor layer 140 and the gate insulating layer 130. The data wiring DL, 163, and 165 and the gate wiring GL and 123 may include substantially a same material or may include different materials.

The data wiring DL, 163, and 165 includes the data line DL, the source electrode 163, and the drain electrode 165.

The data line DL may be disposed parallel to a first branch electrode 181 to be described hereinbelow. In addition, although not illustrated, the data line DL may be disposed in a direction, e.g., a second direction D2, which orthogonally intersects the gate line GL.

The source electrode 163 is branched off from the data line DL to extend onto the gate electrode 123. The drain electrode 165 has a bar-shaped end portion which opposes the source electrode 163 and another end portion which has a larger planar area than that of the bar-shaped end portion of the drain electrode 165.

The channel, through which electric charges move when the TFT is driven, is formed in the semiconductor layer 140 between the source electrode 163 and the drain electrode 165.

For example, in a case where the semiconductor layer 140 and the data wiring DL, 163, and 165 are formed using substantially a same mask, the data wiring DL, 163, and 165 may have substantially a same pattern as a pattern of the semiconductor layer 140 except the channel area.

A first protection layer 171 is disposed over the entirety of a resultant structure formed with the data wiring DL, 163, and 165. The first protection layer 171 may have a monolayer structure or a multilayer structure including, for example, silicon oxide, silicon nitride, a photosensitive organic material, or a low dielectric constant insulating material such as a-Si:C:O or a-Si:O:F, for example.

A second electrode 190 is disposed over an entire surface of the first protection layer 171 except a portion in which a contact hole to be described hereinbelow is formed. The second electrode 190 may include a transparent conductor such as indium tin oxide (ITO) or indium zinc oxide (IZO).

In a first exemplary embodiment of the LCD device 500, the second electrode 190 is a common electrode. That is, the second electrode 190 receives a common voltage from a common voltage line (not illustrated) disposed on the non-display area 110b of the first substrate 110. The common voltage line (not illustrated) and the gate wiring GL and 123 may be simultaneously provided through substantially a same process.

A second protection layer 172 is disposed over a resultant structure formed with the second electrode 190. The second protection layer 172 may include a material included in the first protection layer 171.

A first electrode 180 is disposed on the second protection layer 172. The first electrode 180 may include a transparent conductor such as indium tin oxide (ITO) or indium zinc oxide (IZO).

A contact hole 175 exposing a portion of the drain electrode 165 is defined in the first protection layer 171, the second electrode 190, and the second protection layer 172.

In a first exemplary embodiment of the LCD device 500, the first electrode 180 is a pixel electrode connected to the TFT. The first electrode 180 receives the data voltage from the drain electrode 165 through the contact hole 175.

The first electrode 180 includes a first connecting electrode 183 extending in a direction, e.g., the first direction D1, the plurality of first branch electrodes 181 extending from the first connecting electrode 183 in the second direction D2 to have a predetermined angle, and a first contact portion 185 branching off from the first connecting electrode 183 toward the another end portion of the drain electrode 165.

As illustrated in FIG. 4, the plurality of first branch electrodes 181 may generate a horizontal electric field, along with the second electrode 190 which is a planar electrode. A detailed configuration of the first electrode 180 will be described hereinbelow.

Hereinafter, the upper panel 200 will be described.

A second substrate 210 is an insulating substrate including plastic or transparent glass such as soda lime glass or borosilicate glass, for example.

A light blocking member 220 and a color filter 230 are disposed on the second substrate 210.

The light blocking member 220 defines an aperture area through which light is transmitted. The light blocking member 220 is also referred to as a black matrix, and defines a pixel area. The light blocking member 220 may include an opaque organic material or metal oxide such as chromium oxide ($CrO_x$).

A substantial portion of the color filter 230 is provided in an area surrounded by the light blocking member 220. The color filter 230 may be one selected from a group consisting of a red color filter, a green color filter, a blue color filter, a cyan color filter, a magenta color filter, a yellow color filter, and a white color filter. Three primary colors of red, green, and blue or cyan, magenta, and yellow may define a basic pixel group for forming a color.

An overcoat layer 240 is disposed on the light blocking member 220 and the color filter 230. The overcoat layer 240 planarizes an uneven surface of a layer therebelow, e.g., the light blocking member 220 and the color filter 230, and prevents exudation of an undesired material from the layer to the liquid crystal layer 300.

In addition, alignment layers 101 and 201 are disposed on inner surfaces of the two display panels 100 and 200. Alignment directions of the alignment layers 101 and 201 may be parallel to the second direction D2. Accordingly, the liquid crystal molecules 301 of the liquid crystal layer 300 may be pre-aligned so that a major axis of the liquid crystal molecules 301 is parallel to the second direction D2 in the absence of an electric field.

In addition, the liquid crystal molecules 301 of the liquid crystal layer 300 may be pre-aligned in a direction parallel to the first branch electrode 181 in the absence of an electric field.

Figure 5:
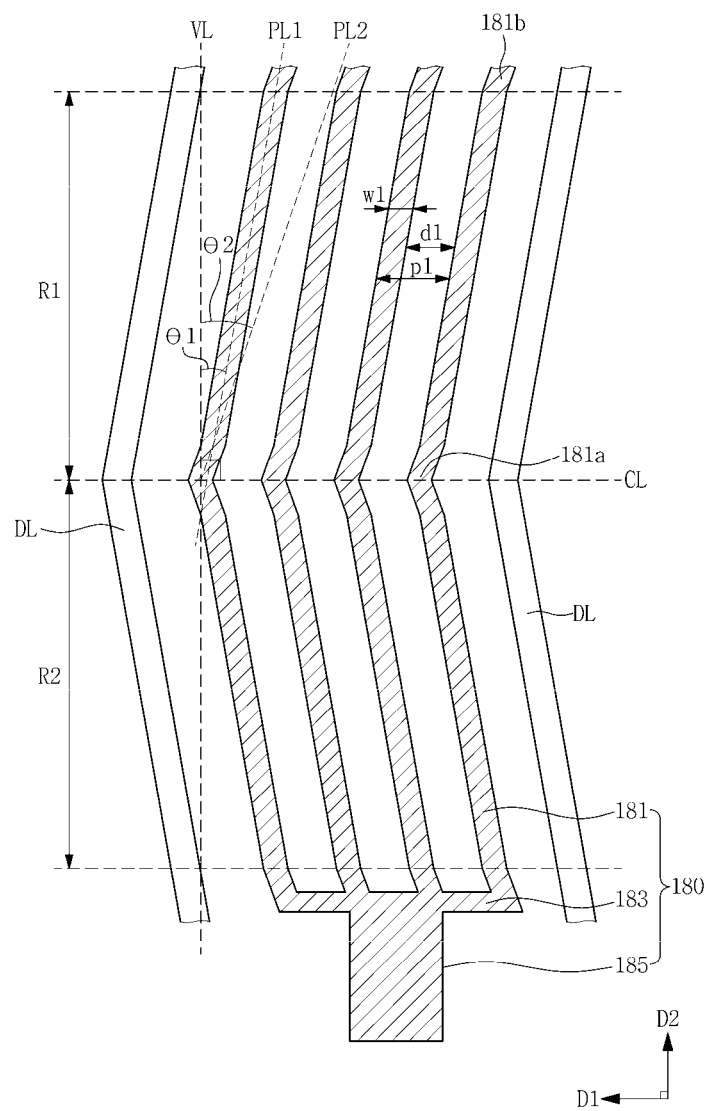
FIG. 5 is a plan view illustrating a data line and a first electrode of a first exemplary embodiment of an LCD device.

FIG. 5 is a plan view illustrating the data line DL and the first electrode 180 of a first exemplary embodiment of the LCD device 500.

Referring to FIG. 5, the first electrode 180 includes the first connecting electrode 183 extending in a direction, e.g., the first direction D1, the plurality of first branch electrodes 181 extending from the first connecting electrode 183 in the second direction D2 to have a predetermined angle, and the first contact portion 185 branching off from the first connecting electrode 183 and extending toward an opposite direction to the plurality of first branch electrodes 181.

In a first exemplary embodiment of the LCD device 500, only a single first connecting electrode 183, extending parallel to the gate line GL, is provided such that a disclination area, in which liquid crystals are not controlled by a horizontal electric field, may be reduced and thus transmittance may be effectively increased.

The first branch electrode 181 extends to have an oblique angle with respect to a direction parallel to the second direction D2. Hereinafter, an angle refers to an acute angle rather than an obtuse angle.

The first branch electrode 181 forms a first angle θ1 with respect to a normal line VL which is orthogonal to the gate line GL. That is, the first angle θ1 is defined as an angle between an imaginary straight line PL1 extending along a center of the first branch electrode 181 and an imaginary line VL parallel to the second direction D2. In such an exemplary embodiment, the first angle θ1 may be in a range of about 9° to about 30°.

In a case that the first angle θ1 is defined less than the above range, a difference in response speed between "rising," in which a polarity of a pixel voltage is changed from negative to positive, and "falling," in which the polarity of the pixel voltage is changed from positive to negative, increases, and when an LCD device is driven by low frequency, a luminance difference caused by the response speed difference may be recognized. In addition, in a case that the first angle θ1 is defined greater than the above range, a difference in the pixel voltage corresponding to a gray scale is reduced such that there may be a difficulty in differentiating alignment states of liquid crystal molecules corresponding to respective gray scales.

A first exemplary embodiment of the LCD device 500 includes the plurality of first branch electrodes 181 that have an angle in a range of about 9° to about 30° with respect to the normal line VL such that in a low frequency driving, a luminance difference may not be recognized, a gray-scale display may be stabilized, and flickering may be reduced.

The first branch electrode 181 includes at least one bent portion 181a in a center of the first branch electrode 181 and an edge portion 181b at opposite end portions of the first branch electrode 181. A second angle θ2 between a line passing the bent portion 181a and the edge portion 181b and the normal line VL orthogonal to the gate line GL may be greater than the first angle θ1. That is, the second angle θ2 is defined as an angle between an imaginary straight line PL2 extending along a center of the bent portion 181a and an imaginary line, i.e., the normal line VL, which is parallel to the second direction D2. In such an exemplary embodiment, the second angle θ2 is greater than the first angle θ1.

Accordingly, a texture issue that may occur when the liquid crystal molecules 301 are not controlled to be reverse-twisted at the bent portion 181a and the edge portion 181b of the first electrode 180 may be reduced.

In addition, the first electrode 180 may be divided into two or more domains based on a direction in which the first branch electrode 181 is inclined with respect to the first direction D1.

For example, as illustrated in FIG. 5, the first electrode 180 may be divided into a first domain R1 and a second domain R2 with respect to an imaginary central line CL. The first branch electrodes 181 in the first domain R1 extend upwards with respect to the imaginary central line CL, and the first branch electrodes 181 in the second domain R2 extend downwards with respect to the imaginary central line CL. The first branch electrode 181 may have inversion symmetry with respect to the imaginary central line CL. That is, the first branch electrode 181 may be symmetric with respect to the imaginary central line CL.

As such, as the first electrode 180 is divided into a plurality of domains which have different inclination angles of the liquid crystal molecules in the plurality of domains, a viewing angle of the LCD device 500 may be improved.

The first branch electrode 181 has a first width w1 and the first branch electrodes 181 are each spaced apart from one another at a first distance dl. The first distance dl is greater than the first width w1 and a ratio between the first distance dl and the first width w1 may be in a range of about 1:0.65 to about 1:0.85.

In addition, a sum of the first width w1 and the first distance dl may be in a range of about 5.0 μm to about 6.0 μm. That is, a pitch p1 between adjacent ones of the first branch electrodes 181 may be in a range of about 5.0 μm to about 6.0 μm, for example, 5.6 μm.

In a case where the first width w1 of the first branch electrode 181 is too small, the number of the first branch electrodes 181 disposed in a single pixel PX increases. Accordingly, an area of the first electrode 180 with respect to an area of the pixel PX increases such that a transmittance may decrease. In addition, in a case where the first distance dl of the first branch electrode 181 is large, a greater level of the pixel voltage needs to be applied to the pixel electrode to effectively control the liquid crystal molecules 301 in the liquid crystal layer 300. Accordingly, power consumption of the LCD device 500 may increase disadvantageously.

Accordingly, the LCD device including the first branch electrode 181 having the above-described structure may be driven with relatively low power consumption.

The first electrode 180 receives the data voltage from the drain electrode 165 through the first contact portion 185 connected to a portion of the drain electrode 165 via the contact hole 175.

Figure 6:
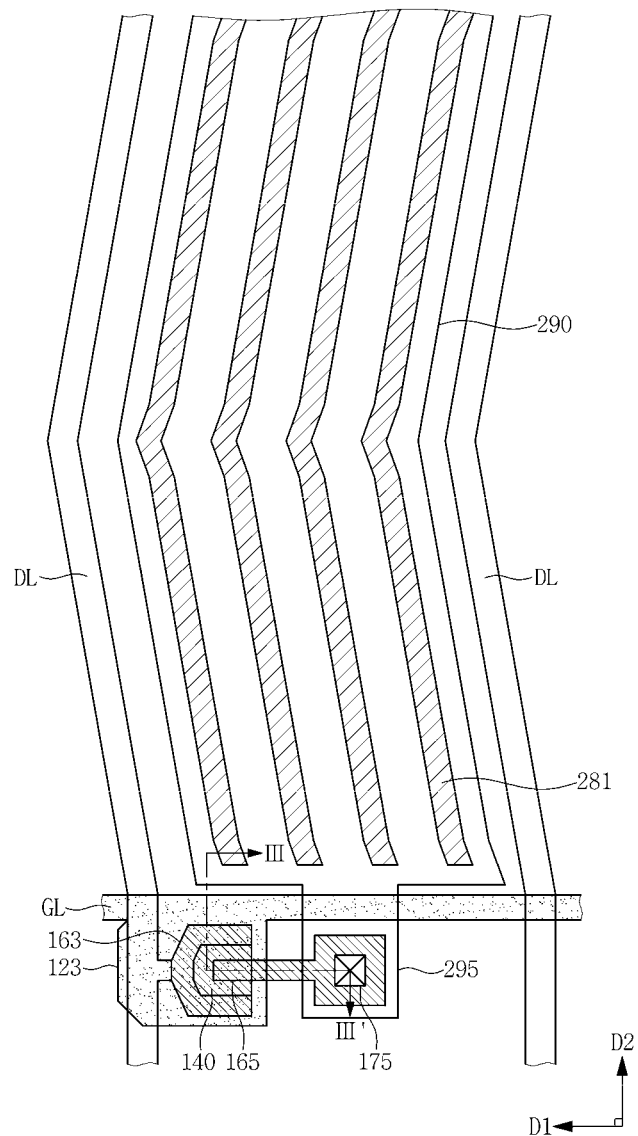
FIG. 6 is a plan view illustrating a pixel of a second exemplary embodiment of an LCD device.
Figure 7:
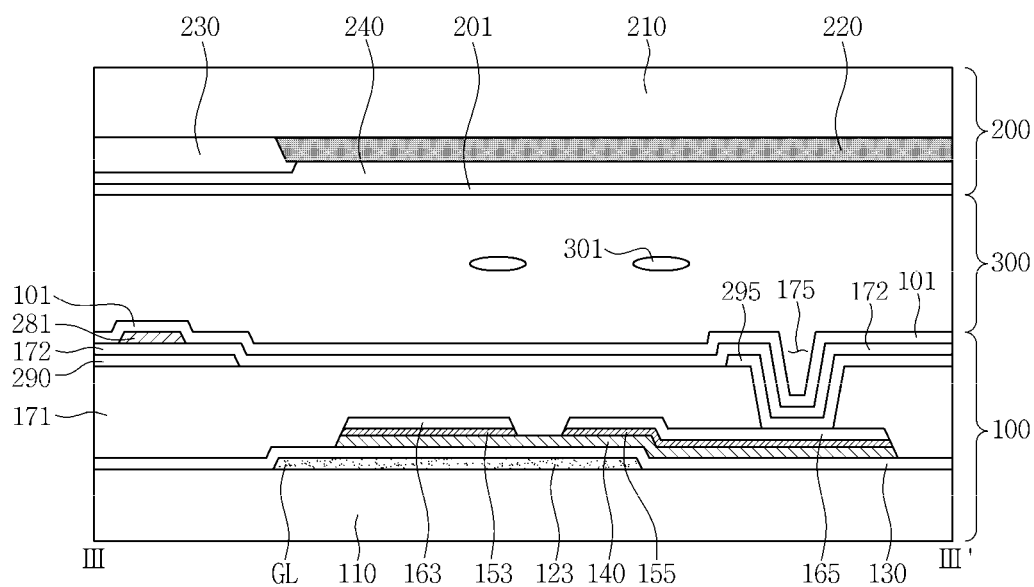
FIG. 7 is a cross-sectional view taken along line of FIG. 6.

Hereinafter, a second exemplary embodiment will be described with reference to FIGS. 6 and 7. FIG. 6 is a plan view illustrating a pixel of a second exemplary embodiment of an LCD device, and FIG. 7 is a cross-sectional view taken along line III-III' of FIG. 6.

Configurations of a second exemplary embodiment of the LCD device 500 are substantially the same as configurations of a first exemplary embodiment of the LCD device 500 illustrated in FIGS. 1, 2, 3, 4, and 5 except configurations of a first electrode 281 and a second electrode 290.

The second electrode 290 is disposed on a first protection layer 171. The second electrode 290 may include a transparent conductor such as indium tin oxide (ITO) or indium zinc oxide (IZO). The second electrode 290 includes a second contact portion 295 branching off from a planar electrode. The first protection layer 171 has a contact hole 175 exposing a portion of a drain electrode 165.

In a second exemplary embodiment of the LCD device 500, the second electrode 290 is a pixel electrode connected to a TFT. The second electrode 290 receives a data voltage from the drain electrode 165 through the second contact portion 295 connected to the drain electrode 165 via the contact hole 175.

A second protection layer 172 is disposed over the entirety of a resultant structure formed with the second electrode 190. The second protection layer 172 may include a material included in the first protection layer 171.

A first electrode 281 is disposed on the second protection layer 172. The first electrode 281 may include a transparent conductor such as indium tin oxide (ITO) or indium zinc oxide (IZO).

In a second exemplary embodiment of the LCD device 500, the first electrode 281 is a common electrode. That is, the first electrode 281 receives a common voltage from a common voltage line (not illustrated) disposed on the non-display area 110b of a first substrate 110. The common voltage line (not illustrated) and a gate wiring GL and 123 may be simultaneously provided through substantially a same process.

The first electrode 281 includes a plurality of first branch electrodes extending in a second direction D2 to have a predetermined angle with respect to the gate line GL. The plurality of first branch electrodes 281 may generate a horizontal electric field along with the second electrode 290 which is a planar electrode.

Figure 8:
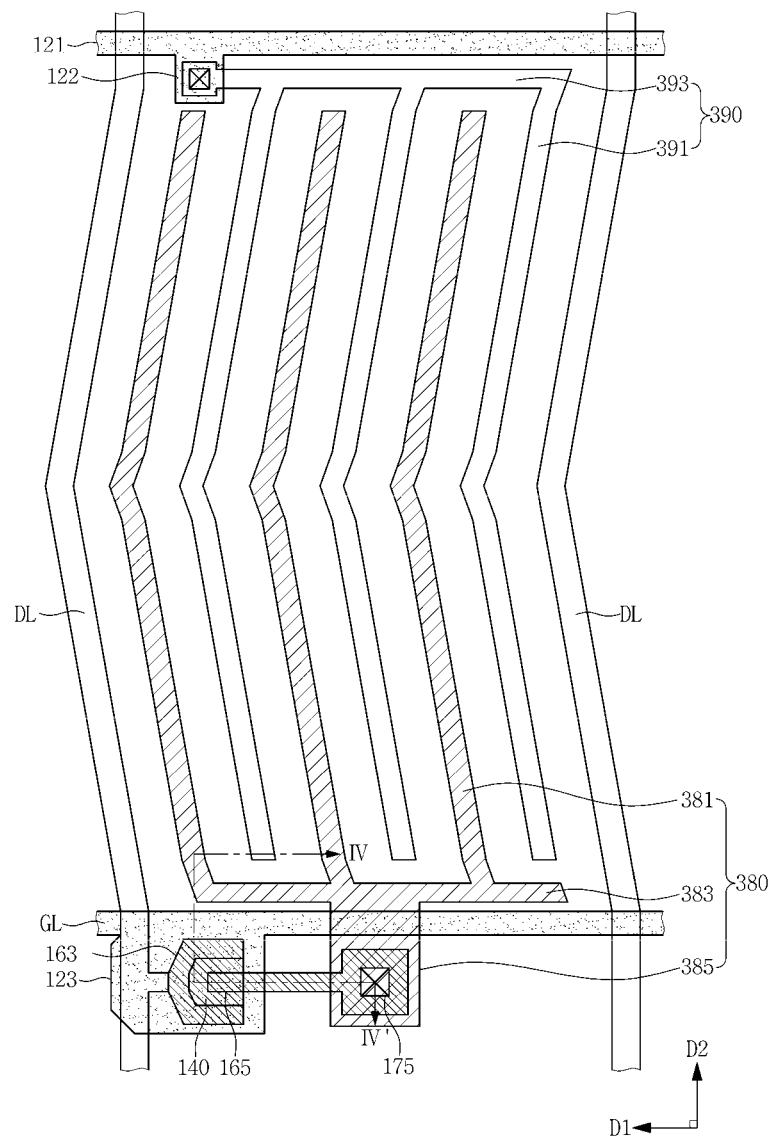
FIG. 8 is a plan view illustrating a pixel of a third exemplary embodiment of an LCD device.

Hereinafter, a third exemplary embodiment and a fourth exemplary embodiment will be described with reference to FIGS. 8, 9, and 10. FIG. 8 is a plan view illustrating a pixel of a third exemplary embodiment of the LCD device 500, FIG. 9 is a cross-sectional view taken along line IV-IV' of FIG. 8, and FIG. 10 is a cross-sectional view illustrating a fourth exemplary embodiment which corresponds to a portion taken along line IV-IV' of FIG. 8.

Figure 9:
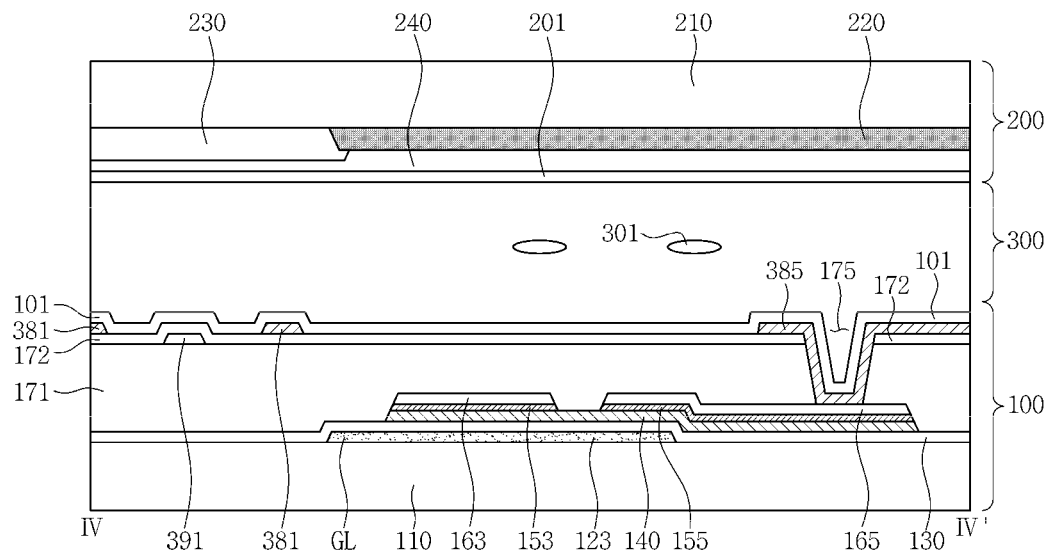
FIG. 9 is a cross-sectional view taken along line IV-IV' of FIG. 8.
Figure 10:
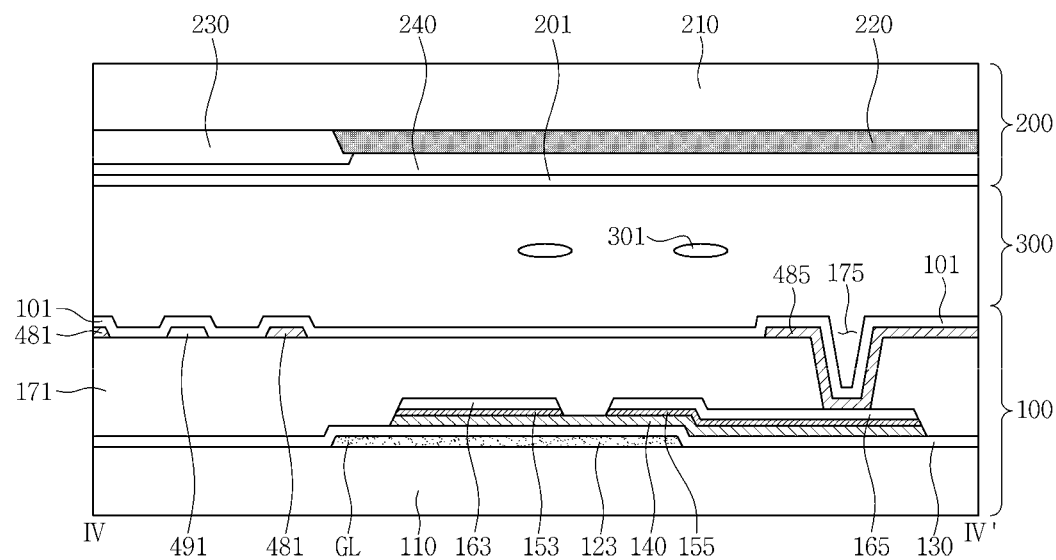
FIG. 10 is a cross-sectional view illustrating a fourth exemplary embodiment which corresponds to a portion taken along line IV-IV' of FIG. 8.

Referring to FIGS. 8 and 9, in a third exemplary embodiment of the LCD device 500, a second electrode 390 includes a plurality of second branch electrodes 391 and a second connecting electrode 393.

The second electrode 390 including the plurality of second branch electrodes 391 and the second connecting electrode 393 is disposed on a first protection layer 171. The second electrode 390 may include a transparent conductor such as indium tin oxide (ITO) or indium zinc oxide (IZO).

In a third exemplary embodiment of the LCD device 500, the second electrode 390 is a common electrode. That is, the second electrode 390 receives a common voltage through a common wiring 121 disposed on a first substrate 110 and a contact electrode 122 protruding from the common wiring 121. The common wiring 121 may receive the common voltage from a common voltage line (not illustrated) disposed on the non-display area 110b of the first substrate 110. The common wiring 121, the contact electrode 122, and the common voltage line (not illustrated) may be simultaneously provided through substantially a same process, along with a gate wiring GL and 123.

The second electrode 390 includes the second connecting electrode 393 extending in a direction, e.g., a first direction D1, and the plurality of second branch electrodes 391 extending from the second connecting electrode 393 in a second direction D2 to have a predetermined angle.

A second protection layer 172 is disposed over a resultant structure formed with the second electrode 390. The second protection layer 172 may include substantially a same material as a material included in the first protection layer 171.

A first electrode 380 is disposed on the second protection layer 172. The first electrode 380 may include a transparent conductor such as indium tin oxide (ITO) or indium zinc oxide (IZO).

In a third exemplary embodiment of the LCD device 500, the first electrode 380 is a pixel electrode connected to a TFT. The first electrode 380 receives a data voltage from a drain electrode 165 through the first contact portion 385 connected to the drain electrode 165 via a contact hole 175.

The first electrode 380 includes a first connecting electrode 383 extending in a direction, e.g., the first direction D1, a plurality of first branch electrodes 381 extending from the first connecting electrode 383 in the second direction D2 to have a predetermined angle, and a first contact portion 385 branching off from the first connecting electrode 383. The plurality of first branch electrodes 381 may generate a horizontal electric field along with the plurality of second branch electrodes 391.

As illustrated in FIG. 8, the first branch electrode 381 may be parallel to the second branch electrode 391, and the first connecting electrode 383 may be parallel to the second connecting electrode 393.

The first branch electrode 381 forms a first angle θ1 with respect to a normal line VL which is orthogonal to a gate line GL, as in the aforementioned exemplary embodiments. In such an exemplary embodiment, the second branch electrode 391, similar to the first branch electrode 381, forms the first angle θ1 with the normal line VL which is orthogonal to the gate line GL, and the first angle θ1 may be in a range of about 9° to about 30°.

In addition, the second branch electrode 391, similar to the first branch electrode 381, may have a first width w1 and may be spaced apart from an adjacent one of the first branch electrodes 381 at a first distance d1. The first distance d1 is greater than the first width w1, and a ratio between the first distance d1 and the first width w1 may be in a range of about 1:0.65 to about 1:0.85.

In addition, a sum of the first width w1 and the first distance d1 may be in a range of about 5.0 μm to about 6.0 μm. That is, a pitch p1 between the first branch electrode 381 and the second branch electrode 391 may be in a range of about 5.0 μm to about 6.0 μm, for example, 5.6 μm.

Accordingly, a third exemplary embodiment of the LCD device 500 may be driven with relatively low power consumption and may prevent flickering.

Referring to FIG. 10, in a fourth exemplary embodiment of the LCD device 500, a first electrode 481 and a second electrode 491 are disposed on a same planar surface to have a predetermined space formed therebetween. That is, the first electrode 481 and the second electrode 491 may be simultaneously provided on a first protection layer 171, including substantially a same material. The first electrode 481 and the second electrode 491 may include a transparent conductor such as indium tin oxide (ITO) or indium zinc oxide (IZO).

Accordingly, a manufacturing process of a lower panel 100 may be simplified, and a thickness of the lower panel 100 may be reduced.

As set forth hereinabove, in one or more exemplary embodiments, an LCD device includes a plurality of branch electrodes having a predetermined angle with respect to a gate line such that flickering that may occur when the LCD device is driven by low frequency may be significantly reduced and the LCD device may consume relatively less power.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings. Various features of the above described and other embodiments can be mixed and matched in any manner, to produce further embodiments consistent with the inventive concept.

What is claimed is:

1. A liquid crystal display device comprising:
   a first substrate and a second substrate opposing each other;
   a liquid crystal layer disposed between the first substrate and the second substrate;
   a gate line disposed on the first substrate, the gate line extending in a first direction;
   a data line intersecting the gate line;
   a timing controller connected to the gate line, the timing controller outputting a gate control signal by a frequency of about 15 hertz (Hz) to about 30 Hz;
   a first electrode disposed on the first substrate; and
   a second electrode disposed on the first substrate, the second electrode spaced apart from the first electrode,
   wherein the first electrode comprises a plurality of first branch electrodes having an angle of about 9 degrees to about 30 degrees with respect to a normal line which is orthogonal to the gate line,
   wherein the plurality of first branch electrodes have a first width, the plurality of first branch electrodes are spaced apart from one another at a first distance, and the first distance is greater than the first width,
   wherein a ratio between the first distance and the first width is in a range of about 1:0.65 to about 1:0.85, and
   wherein a sum of the first width and the first distance is equal to or greater than 5.0 µm and equal to or less than 6.0 µm.

2. The liquid crystal display device as claimed in claim 1, further comprises a connecting electrode that connects the plurality of first branch electrodes,
   wherein the connecting electrode is parallel to the gate line.

3. The liquid crystal display device as claimed in claim 1, wherein the first branch electrode comprises at least one bent portion.

4. The liquid crystal display device as claimed in claim 1, wherein the first branch electrode is symmetric with respect to a bent portion.

5. The liquid crystal display device as claimed in claim 1, wherein the data line extends in a second direction which is substantially orthogonal to the first direction.

6. The liquid crystal display device as claimed in claim 1, wherein the data line extends substantially parallel to the first branch electrode.

7. The liquid crystal display device as claimed in claim 1, wherein the liquid crystal layer comprises liquid crystal molecules having positive dielectric anisotropy.

8. The liquid crystal display device as claimed in claim 1, wherein the second electrode is a planar electrode.

9. The liquid crystal display device as claimed in claim 1, wherein the second electrode comprises a second branch electrode parallel to the first branch electrode.

10. The liquid crystal display device as claimed in claim 1, wherein the second electrode is disposed on substantially a same layer as a layer on which the first electrode is disposed.

11. The liquid crystal display device as claimed in claim 1, further comprising a thin film transistor disposed on the first substrate, the thin film transistor connected to the gate line and the data line.

12. The liquid crystal display device as claimed in claim 11, wherein the first electrode is connected to the thin film transistor.

13. The liquid crystal display device as claimed in claim 11, wherein the second electrode is connected to the thin film transistor.

14. A liquid crystal display device comprising:
   a first substrate and a second substrate opposing each other;
   a liquid crystal layer disposed between the first substrate and the second substrate;
   a gate line disposed on the first substrate, the gate line extending in a first direction;
   a data line intersecting the gate line;
   a timing controller connected to the gate line, the timing controller outputting a gate control signal by a frequency of about 15 hertz (Hz) to about 30 Hz;
   a first electrode disposed on the first substrate; and
   a second electrode disposed on the first substrate, the second electrode spaced apart from the first electrode,
   wherein the first electrode comprises a plurality of first branch electrodes having an angle of about 9 degrees to about 30 degrees with respect to a normal line which is orthogonal to the gate line,
   wherein the plurality of first branch electrodes have a first width, the plurality of first branch electrodes are spaced apart from one another at a first distance, and the first distance is greater than the first width,
   wherein a sum of the first width and the first distance is equal to or greater than 5.0 µm and equal to or less than 6.0 µm.

* * * * *